United States Patent [19]

Torii et al.

[11] Patent Number: 5,191,272
[45] Date of Patent: Mar. 2, 1993

[54] METHOD OF ADJUSTING GAIN FOR MOTOR CONTROL

[75] Inventors: Nobutoshi Torii, Hachioji; Ryo Nihei; Tetsuaki Kato, both of Minamitsuru, all of Japan

[73] Assignee: Fanuc Ltd., Japan

[21] Appl. No.: 776,418

[22] PCT Filed: Apr. 1, 1991

[86] PCT No.: PCT/JP91/00434
§ 371 Date: Nov. 25, 1991
§ 102(e) Date: Nov. 25, 1991

[87] PCT Pub. No.: WO91/15893
PCT Pub. Date: Oct. 17, 1991

[30] Foreign Application Priority Data

Apr. 3, 1990 [JP] Japan .................. 2-88670

[51] Int. Cl.⁵ .................. H02P 5/00; G05B 11/32; G05B 13/02
[52] U.S. Cl. .................. 318/609; 318/610; 318/560; 364/176; 364/178
[58] Field of Search .................. 318/560-640; 395/80-99; 901/3, 5, 9, 12, 15-23; 364/176, 178, 177

[56] References Cited

U.S. PATENT DOCUMENTS

| 4,841,208 | 6/1989 | Itoh ............ 318/561 |
| 4,885,676 | 12/1989 | Zweighaft ......... 318/611 |
| 4,940,924 | 7/1990 | Mizuno et al. ...... 318/560 |
| 5,032,777 | 7/1991 | Ogawa ............ 318/616 |
| 5,049,796 | 9/1991 | Seraji ............ 318/568.1 |

FOREIGN PATENT DOCUMENTS 3408551 9/1985 Fed. Rep. of Germany .

OTHER PUBLICATIONS

Aström, K. J., and B. Wittenmark, Adaptive Control, Addison-Wesley, 1989, pp. 372-379 (Reading, Massachusetts).

Primary Examiner—Paul Ip
Attorney, Agent, or Firm—Staas & Halsey

[57] ABSTRACT

The feedback gain for motor control for a control system in which the inertia of a load is greatly variable is adjusted. First, a feedback gain (K1) is determined. The value of feedback gain is calculated from a servomotor itself or the like, and selected so that the control loop will not oscillate (S1). A feed-forward gain (K) is determined according to a learning process with the feedback gain (K1) (S2). Then, a feedback gain (K1) is calculated from the feed-forward gain (K) (S3). Thereafter, a feed-forward gain (K) is determined again according to a learning process based on the feedback gain (S4). The second feed-forward gain (K) and the feedback gain (K1) are used to establish a control system. In this manner, a control system having an optimum feed-forward gain and an optimum feedback gain can be established.

4 Claims, 3 Drawing Sheets

METHOD OF ADJUSTING GAIN FOR MOTOR CONTROL

BACKGROUND OF THE INVENTION

1. Field of the Invention

The present invention relates to a method of adjusting a gain for motor control for a robot or the like, and more particularly to a method of automatically adjusting the feedback gain of a motor control loop.

2. Background of the Related Art

It is highly difficult to effect a feed-forward control process on a system, such as a robot, in which the inertia of a load varies to a large extent depending on whether the arm of the system is extended or contracted, and which has servomotors and mechanical movable parts with large speed-reduction ratios of mechanisms. This is because a feed-forward gain, which is not in a feedback loop, is ineffective unless parameters are in exact conformity with each other.

Heretofore, it has been impossible to calculate a feed-forward gain if the value of inertia is unknown. In the event that the inertia is subjected to a variation, it is very difficult to calculate an average inertia value, and highly cumbersome to do so when such a calculation is carried out.

One solution is disclosed in a patent application entitled "Method of learning a feed-forward gain for motor control", filed on Feb. 21, 1990 by the applicant. In the disclosed method, a feed-forward gain is determined according to a learning process.

A feedback gain of a feedback loop, i.e., a proportional gain or the like, is determined in view of a step response, etc., of the system.

When a feedback gain is determined in view of a step response, etc., however, it takes considerable time to measure the step response, etc. Since determination of a feedback gain requires a lot of skill on the part of the operator, difficulty has been experienced in objectively determining a proper value of feedback gain.

SUMMARY OF THE INVENTION

In view of the aforesaid drawbacks of the conventional method, it is an object of the present invention to provide a method of automatically adjusting a feedback gain for motor control.

Another object of the present invention is to provide a method of adjusting a motor control feedback gain by calculating it from a feed-forward gain.

To accomplish the above objects, there is provided a method of adjusting a feedback gain for motor control for a control system in which the inertia of a load is greatly variable, said method comprising the steps of determining a first feed-forward gain according to a learning process with a first feedback gain in a feedback system, calculating a second feedback gain from said first feed-forward gain, and determining a second feed-forward gain with said second feedback gain according to a learning process, thereby establishing a motor control loop.

A first feedback gain is determined. The value of feedback gain is calculated from a servomotor itself or the like, and selected so that the control loop will not oscillate. A first feed-forward gain is determined according to a learning process using the first feedback gain. Then, a second feedback gain is calculated from the first feed-forward gain thus determined. Thereafter, a second feed-forward gain is determined again according to a learning process based on the second feedback gain. The second feed-forward gain and the second feedback gain are used to establish a control system. In this manner, a control system having an optimum feed-forward gain and an optimum feedback gain can be established.

DESCRIPTION OF THE PREFERRED EMBODIMENT

An embodiment of the present invention will hereinafter be described with reference to the drawings.

Figure 2:
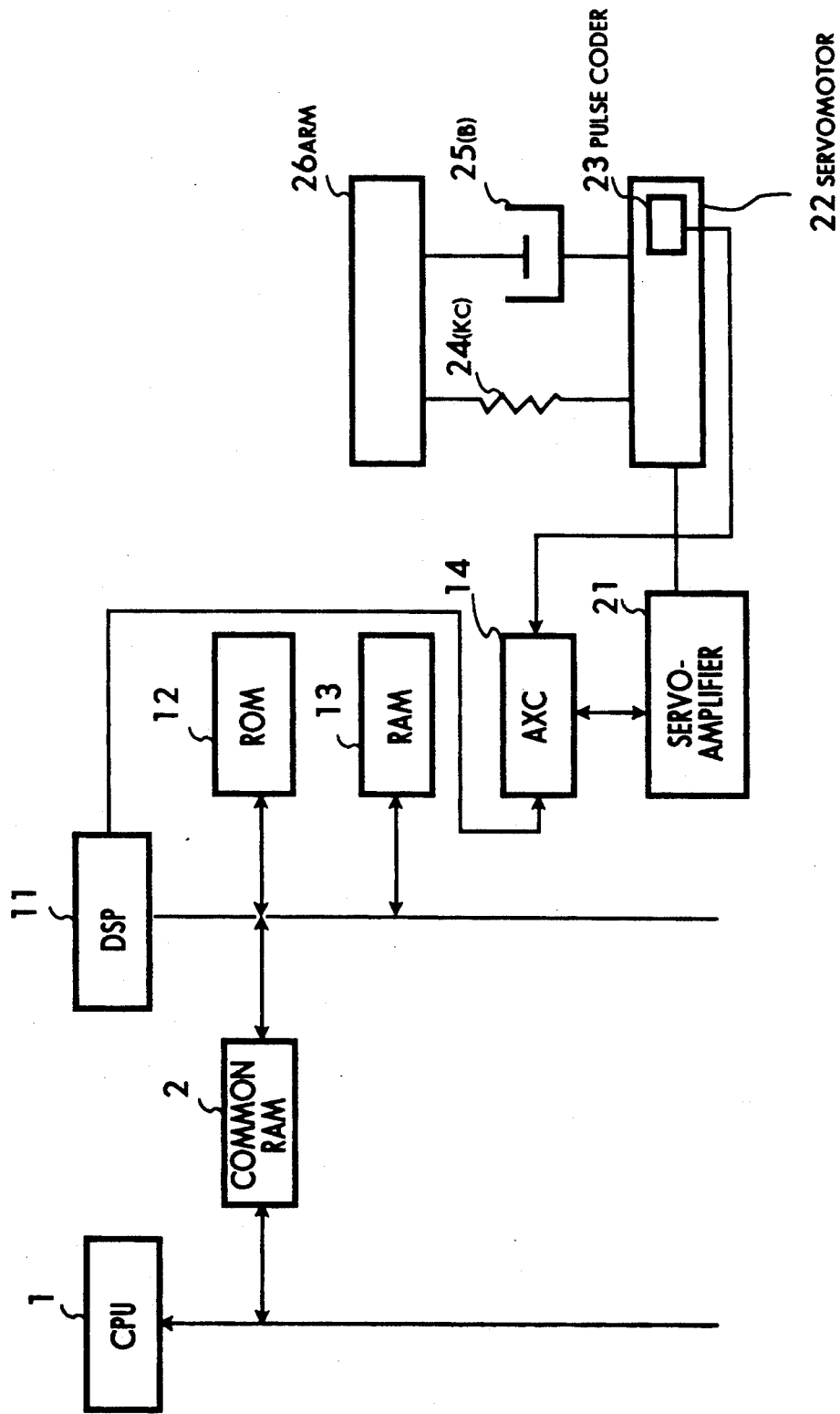
FIG. 2 is a block diagram of the hardware arrangement of a robot system exemplifying the present invention.

FIG. 2 shows in block form the hardware arrangement of a robot system exemplifying the present invention. The robot system has a host processor (CPU) 1 for controlling a robot in its entirety. The host processor 1 writes position commands for the robot into a common RAM 2. Various components including a ROM, a RAM, etc. coupled to the host processor are omitted from illustration in FIG. 2.

The robot has a servomotor 22 that is controlled by a DSP (digital signal processor) 11. The DSP 11 reads a position command from the common RAM 2 at each time interval, and applies a torque command to an axis control circuit (AXC) 14 according to a system program stored in a ROM 12. The DSP 11 carries out necessary calculations using a RAM 13.

More specifically, the DSP 11 calculates a speed command based on an error representing the difference between a position command and a position feedback signal from a pulse coder 23 associated with the servomotor 22. The DSP 11 also differentiates the position feedback signal into a speed feedback signal, and calculates the torque command based on the difference between the speed feedback signal and the speed command.

In response to the torque command from the axis control circuit 14, a servoamplifier 21 energizes the servomotor 22. The servomotor 22 actuates an arm 26 through a speed reducer which has a mechanical system including a spring component 24 (spring constant Kc) and a damping component 25 (damping constant B) that are schematically shown in FIG. 2.

The DSP 11 determines a feed-forward gain according to a learning process (described later on), and also determines a feedback gain according to a calculating process.

Figure 3:
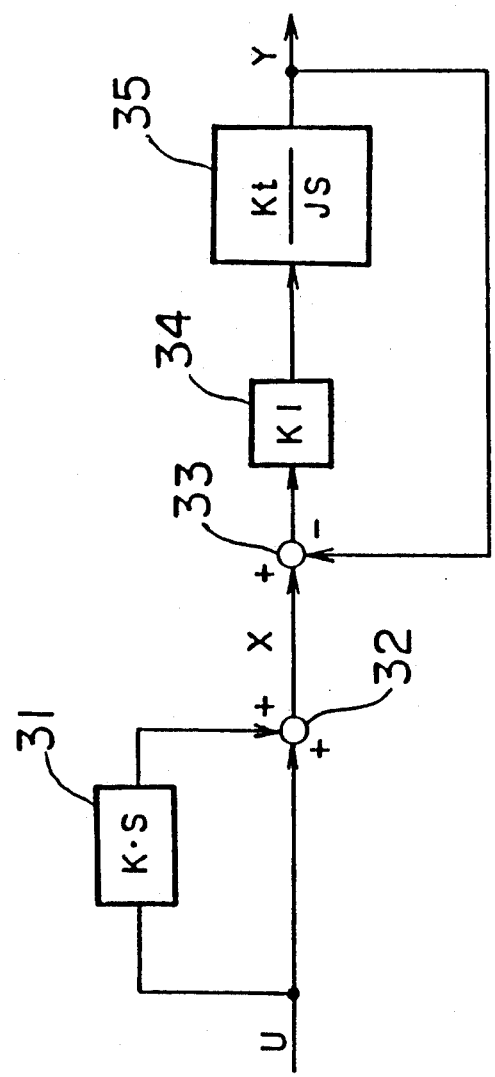
FIG. 3 is a block diagram of a speed loop for motor control.

The process of determining the feedback gain will be described below. First, a speed loop for motor control will be considered. FIG. 3 shows in block form such a speed loop for motor control. A speed command U and a feed-forward loop which has passed through a transfer function 31 are added into an output X by an adder 32. The letter K in the transfer function 31 indicates a feed-forward gain. The output X is applied to an adder 33 by which a speed feedback signal Y is subtracted from the output X, and the difference is applied to a transfer function 34 where K1 indicates a speed gain.

The output from the transfer function 34 is applied to a transfer function 35 where Kt indicates a torque constant of the servomotor, J the inertia of a mechanical system as seen from the servomotor shaft, the inertia being largely variable depending on the or orientation attitude of the robot, and S a Laplace operator.

The output X is given as follows:

$$U*(1+KS)=X$$

where U is the speed command, Y the speed feedback signal, (U−Y) a speed deviation or error, and S the Laplace operator. Solving the equation for U, the following equations are established:

$$U=X/(1+KS)$$

$$X/U=1+KS \qquad (1)$$

This identifies a system which is a reversal of the system with the input X and the output Y as shown in elements 33, 34 and 35 in FIG. 3. The speed gain K1 is determined using the identified system. A transfer function with the input X and the output Y is expressed by:

$$Y/X=1/[\{JS/(K1*Kt)\}+1]$$

$$=1/(TS+1) \qquad (2)$$

where T is a time constant of the system and given by:

$$T=J/(K1*Kt). \qquad (2a)$$

If it is assumed the reversal system expressed by the equation (1) is equal to the equation (2), then the following equation is satisfied:

$$U/X=Y/X=1/(1+KS)$$

$$=1/(1+TS).$$

It can now be understood that the feed-forward gain K represents the time constant of the feedback loop.

If the time constant of a desired feedback loop is indicated by T1, then a proportional gain $K1_N$ to be newly established is given by the following equation:

$$K1_N=(K/T1)*K1a \qquad (3)$$

where K1a is a present proportional gain. When the new proportional gain $K1_N$ is established and inserted in equation (2a) as K1, the time constant T is expressed by:

$$\begin{aligned} T &= J/[(K*K1a*Kt)/T1] \\ &= (T1/K)*\{J/(K1a*Kt)\} \\ &= (T1/K)*K \\ &= T1. \end{aligned}$$

Accordingly, there is obtained a feedback system with a desired time constant. After the new proportional gain $K1_N$ is established, the a new feed-forward gain $K_N$ is learned again to determine an optimum feed-forward gain. By establishing a proportional gain via this process, the gain of the overall system converges to an optimum value.

Figure 1:
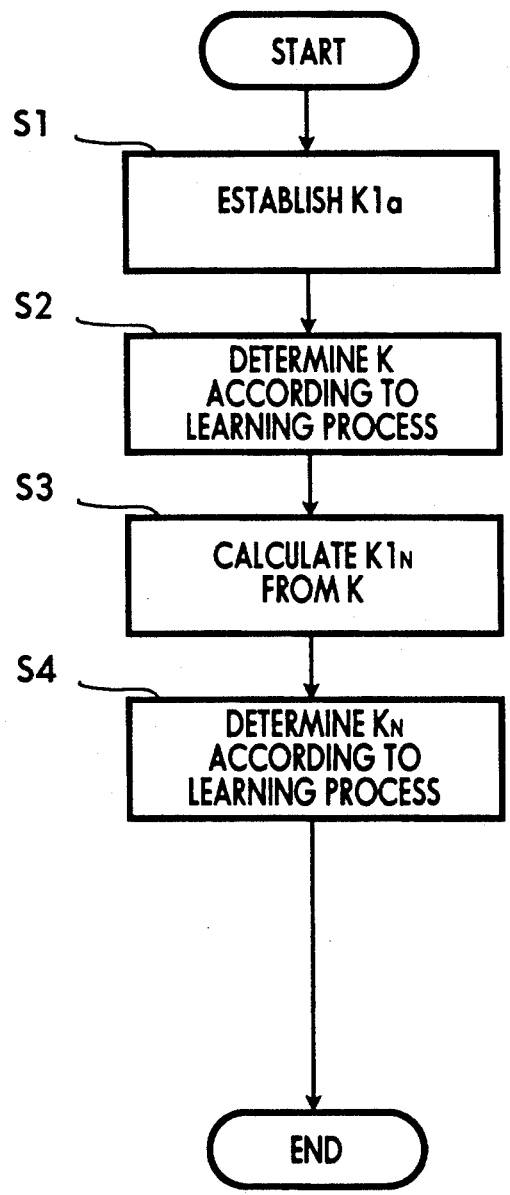
FIG. 1 is a flowchart of the processing sequence of a method of adjusting a gain for motor control according to the present invention.

The processing sequence of the present invention will be described below. FIG. 1 is a flowchart of a method of adjusting a gain for motor control according to the present invention. The numerals following the letter S indicate step numbers in FIG. 1.

[S1] The proportional gain $K1_a$ of a suitable feedback loop is established. The value of the proportional gain $K1_a$ is selected so that the system will not oscillate, according to calculations with respect to the servomotor, itself, etc.

[S2] A feed-forward gain K is determined according to a learning process based on the condition of the feedback loop.

[S3] A new proportional gain $K1_N$ is calculated from the feed-forward gain K according to the equation (3), and established.

[S4] A new feed-forward gain $K_a$ is determined according to a learning process with the new proportional gain $K1_N$.

The feed-forward gain $K_N$ and the feedback gain, i.e., the proportional gain $K1_N$, are used to establish an optimum control loop for the servomotor.

While the feedback gain and the feed-forward gain of the speed loop have been described above, the present invention is also applicable to the feedback gain and the feed-forward gain of a position control loop.

With the present invention, as described above, a feed-forward gain is determined according to a learning process and a feedback gain is calculated from the feed-forward gain. Therefore, a proper feed-forward gain and a proper feedback gain can be determined to establish an optimum control loop.

According to the present invention, vibrations can be reduced and positioning accuracy can be increased in a control looo for a robot or the like.

We claim:

1. A method of adjusting a feedback gain used in a control system implemented by a computer for controlling a motor driving a load having an inertia in which the inertia of the load is greatly variable, said method comprising the steps of:
   determining, using the computer, a first feed-forward gain used in a feed-forward loop of the control system according to a first learning process having a first feedback gain used in a feedback loop of the control system;
   calculating, using the computer, a second feedback gain using said first feed-forward gain; and
   determining, using the computer, a second feed-forward gain using said second feedback gain according to a second learning process, and controlling the motor using the second feedback and feed-forward gains in the control system.

2. A method according to claim 1, wherein said control system controls a mechanism of a robot with a servomotor.

3. A method according to claim 1, wherein said feed-forward gain and said feedback gain are used to control a speed of the motor.

4. A method according to claim 1, wherein said feed-forward gain and said feedback gain are used to control a position of the motor.

* * * * *

UNITED STATES PATENT AND TRADEMARK OFFICE
CERTIFICATE OF CORRECTION

PATENT NO. : 5,191,272
DATED : March 2, 1993
INVENTOR(S) : TORII et al.

It is certified that error appears in the above-identified patent and that said Letters Patent is hereby corrected as shown below:

Col. 3, line 5, after "the" insert --attitude--;
line 6, delete "attitude";
line 63, delete "the".

Col. 4, line 12, delete "," (first occurrence);
line 19, change "$K_a$" to --$K_N$--.

Signed and Sealed this

Fourteenth Day of December, 1993

Attest:

BRUCE LEHMAN

*Attesting Officer*  *Commissioner of Patents and Trademarks*